UNITED STATES PATENT OFFICE.

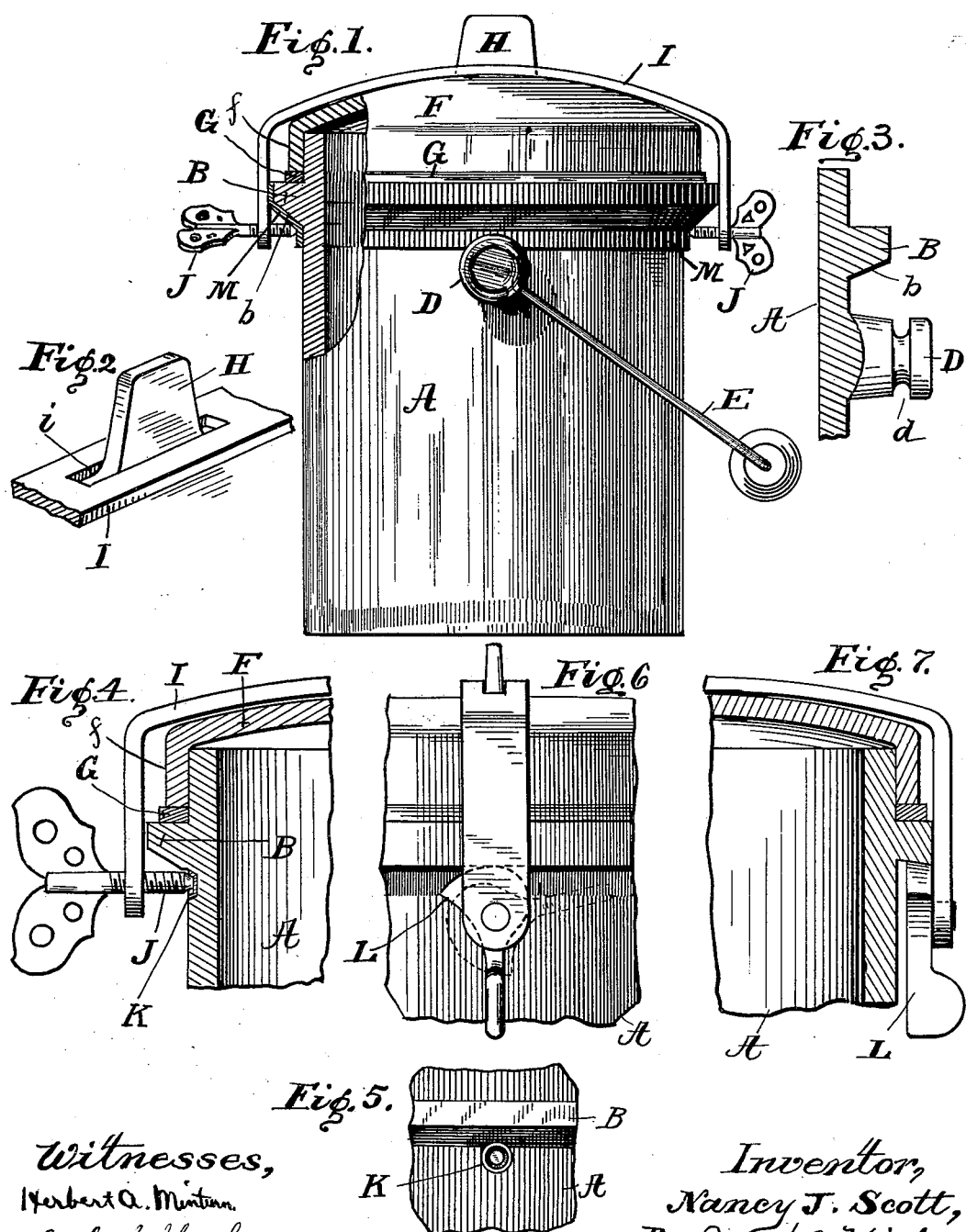

NANCY J. SCOTT, OF INDIANAPOLIS, INDIANA.

VESSEL FOR RETAINING FLAVOR OF FOOD SUPPLIES.

SPECIFICATION forming part of Letters Patent No. 636,457, dated November 7, 1899.

Application filed March 7, 1898. Serial No. 672,869. (No model.)

*To all whom it may concern:*

Be it known that I, NANCY J. SCOTT, a citizen of the United States, residing at Indianapolis, in the county of Marion and State of Indiana, have invented certain new and useful Improvements in Vessels for Retaining the Flavor of Food Supplies, of which the following is a specification.

It is well known that many articles of food, like butter and meat, are so susceptible to a change in flavor that they must be kept in closed vessels to preserve them from contamination, and in refrigerators, where many varieties of food are kept in close contact with each other and in a moist atmosphere, which is specially conducive to the transmission of flavors from one article to another, it has almost been impossible to keep meat and butter in a palatable condition. Improperly-covered crocks and jars of earthenware have been used to a limited extent; but as they have to be opened three or more times a day the difficulty in keeping them air-tight and the additional difficulty in keeping them clean, owing to the absorbent nature of the porous earthenware, has resulted in preventing any but a very limited use of such articles.

The object of this invention is to provide a containing vessel for butter, meat, and the like, having walls of a non-absorbent material, whereby the vessel itself can readily be kept clean, and having a removable top, which can be made air-tight and applied and removed quickly.

I accomplish the object of the invention by the mechanism illustrated in the accompanying drawings, in which—

Figure 1 is a view in side elevation, partially in section, of a jar having my improvements; Fig. 2, a detail in perspective showing the manner in which the knob of the lid is flattened and projected through a longitudinal slot in the locking-bar; Fig. 3, a detail in vertical section of the jar-wall, showing the knob to which the bail is attached; Fig. 4, a detail in vertical section of a modified construction; Fig. 5, a detail in front elevation of the modification shown in Fig. 4; Fig. 6, a detail in front elevation, and Fig. 7 a detail in vertical section, of a second modification.

Similar letters of reference indicate like parts throughout the several views of the drawings.

A represents the containing vessel or jar, which is here shown as cylindrical, but it may be rectangular, octagon, spherical or any other shape in cross-section; but the material of which it is composed will preferably be glass on account of its non-porous and non-absorbent character. At a suitable distance below the mouth of the jar is the outside annular flange B, which has a downward bevel $b$ on its under side.

D are knobs, which are integral and diametrically opposite each other and are circumferentially grooved, as shown at $d$ in Fig. 3, to receive the metal bail E, the ends of which are bent and hooked onto these knobs.

F is the lid, which is preferably concave on its upper surface. It is provided with the circumferential flange $f$, which fits over the end of the jar and rests on a packing-ring G, of elastic material, preferably rubber. The lid is provided with the flat-sided knob H.

I is a metal bar, preferably steel, the ends of which are bent approximately at right angles to the body portion and have threaded openings near the ends, through which the thumb-screws J are screwed. The bar I has a longitudinal slot $i$, through which the knob H is projected, and the lid F is brought down tight onto the jar by the screwing in of the thumb-screws. The ends of the screws are tapered, except right at the tip, which is blunt and flat. The action of the screws coming against the sloping under sides of the flange B is to slide down the inclined surface until the blunt ends of the screws abut against the sides of the jar. This downward movement pulls the lid down tight.

In order to protect the glass flange and jar from chipping by the contact pressure of the screws, I provide the metal band M, which fits the contour of the front and beveled sides of the flange and a portion of the jar immediately under the flange.

In the modification shown in Figs. 4 and 5 a detent or cavity is cast in the glass at the points where the ends of the screws would strike, and metal cups or thimbles K are inserted into the cavities. These form seats for the screws and are cheaper than a band extending completely around the jar.

In the modification shown in Figs. 6 and 7 the flange on the jar is provided with a slight upward bevel on its under side, and the set-screws are supplanted by cam-levers, which are brought from the loose position shown by the dotted lines in Fig. 6 into the position shown by the full lines, in which the cam is pressing up against the under side of the flange. The cam is beveled to fit the slope of the flange, which tends to draw the ends of the locking-bar in toward the jar. Instead of beveling the under side of the flange it might be horizontal without departing from the spirit of this invention.

Having thus fully described my invention, what I claim as new, and wish to secure by Letters Patent of the United States, is—

1. A jar having a mouth not less in diameter than the greatest inside diameter of the jar and having an outside flange with an under side bevel transverse to the said side, said flange being near the top of the jar, a cover adapted to rest on the flange, a packing-ring between the cover and flange, a clamping-bar passing diametrically over the cover and extending down below the flange and secured at its ends to the flange and set screw or screws passing through a threaded opening or openings in the bar and having truncated conical end or ends bearing against the jar to tighten the bar.

2. A jar having a mouth not less in diameter than the greatest inside diameter of the jar and having an outside flange with an under side transverse bevel near its top a metal band around the jar under the flange having an integral portion covering the beveled face of the flange, a cover adapted to rest on the flange, a packing-ring between the cover and flange, a clamping-bar passing diametrically over the cover and secured at its ends to the flange by set-screws, said set-screws passing through the ends of the bar and having truncated conical ends, all substantially as described and specified.

In witness whereof I have hereunto set my hand and seal, at Indianapolis, Marion county, Indiana, this 5th day of March, A. D. 1898.

NANCY J. SCOTT. [L. S.]

Witnesses:
JOSEPH D. JACKSON,
MARION CALDWELL.